May 26, 1964     R. H. POTTS     3,134,175
PIPE TALLIER

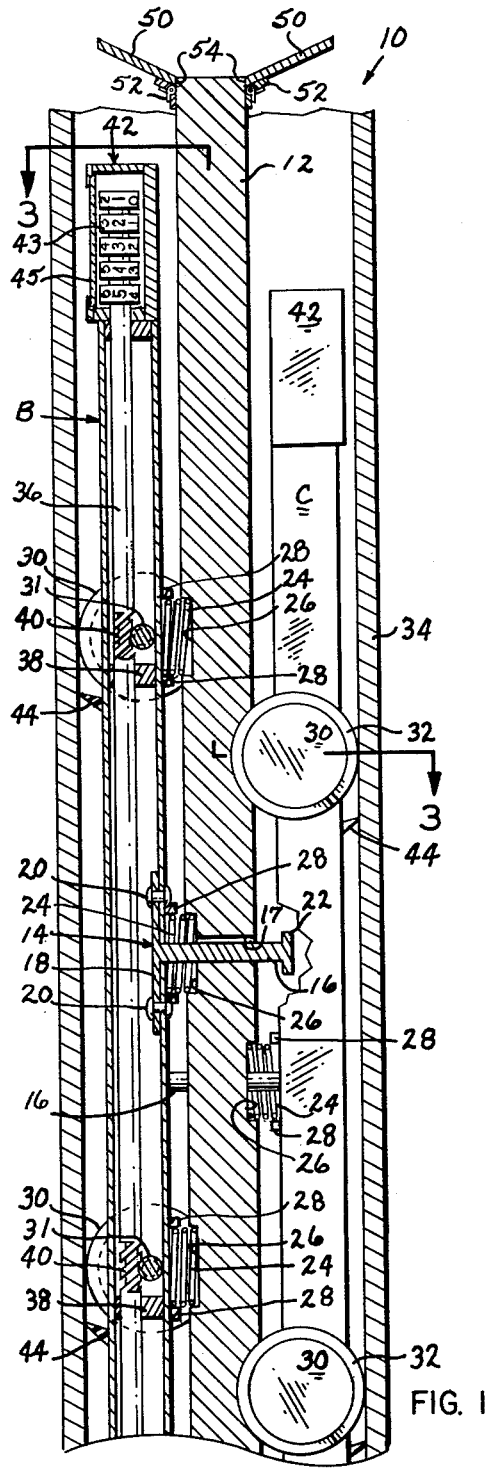
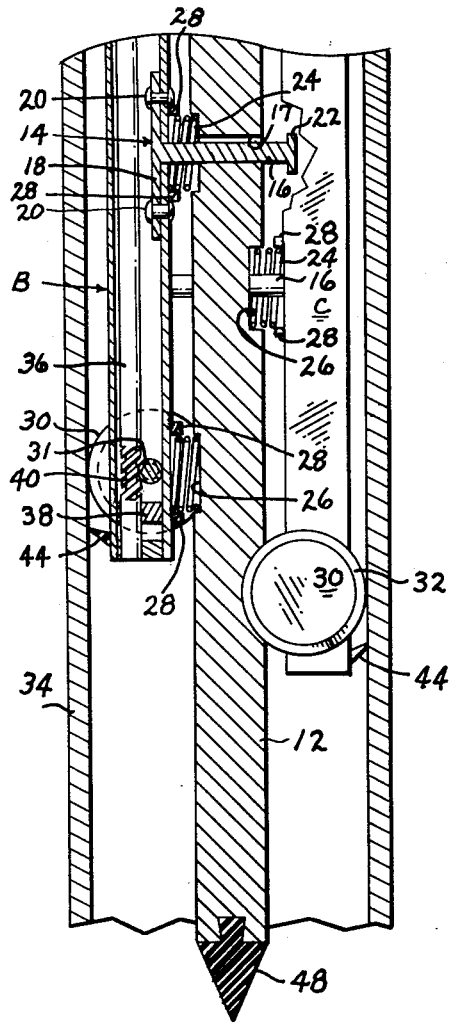
FIG. 1
FIG. 1A
RAY H. POTTS
INVENTOR.
ATTORNEY

Filed Dec. 9, 1960     2 Sheets-Sheet 2

RAY H. POTTS
*INVENTOR.*

ATTORNEY

United States Patent Office 3,134,175
Patented May 26, 1964

3,134,175
PIPE TALLIER
Ray H. Potts, 2437 Carlton Way, Oklahoma City, Okla.
Filed Dec. 9, 1960, Ser. No. 74,929
2 Claims. (Cl. 33—141)

The present invention relates to measuring devices and more particularly to a device for measuring the length of drill pipe as used in rotary drilling of oil wells.

It is common practice in rotary drilling methods to tally or measure the length of each drill joint added to the drill string during the progress of deepening the hole. The length of these joints are added together to determine the approximate depth of penetration at a given time. This method is satisfactory for approximate depth of hole measurements only, for the reason that errors are frequently made in measuring the pipe joints or in adding the figures. It is desirable to ascertain the exact depth of a drilled hole to locate the depth of earth strata particularly when an oil producing formation is encountered.

It is, therefore, the principal object of the instant invention to provide a measuring device for conveniently and accurately measuring the length of drill pipe prior to pulling the latter.

Another object is to provide a pipe measuring device which is actuated by gravity for progressive movement along the inner wall of the drill pipe from the top to the bottom of the pipe.

Another object is to provide a device of this class which may be easily reset and used each time it is desired to measure the pipe.

Still another object is to provide a device of this class which will descend by gravitational attraction through drilling mud or fluid within the drill pipe until finally arrested by the drill bit.

Still another object is to provide a measuring device of this class which includes means for assuring movement of the device the full length of the drill pipe by the action of circulating the drilling fluid while the device is in operation.

A further object is the provision in a device of this class wherein the footage registering means is isolated from the fluid within a well.

Yet another object is to provide a measuring device which simultaneously records, on a plurality of registers, the total depth or length of the pipe.

The present invention accomplishes these and other objects by providing an elongated mandrel to which a plurality of wheel equipped channel members are mounted therearound whereby the wheels contacting the inner wall of the drill pipe drive registering means connected to shafts rotated by the wheels as the mandrel progressively moves through a pipe.

Other objects will be apparent from the following description when taken in conjunction with the accompanying two sheets of drawings, wherein:

FIGURE 1 is a fragmentary vertical cross-sectional view, partly in elevation, illustrating the upper end portion of the device in a fragment of drill pipe;

FIGURE 1A is a view similar to FIG. 1, illustrating the depending end portion of the device forming a continuation of FIG. 1;

Like characters of reference designate like parts in those figures of the drawings in which they occur.

In the drawings:

Figure 2:
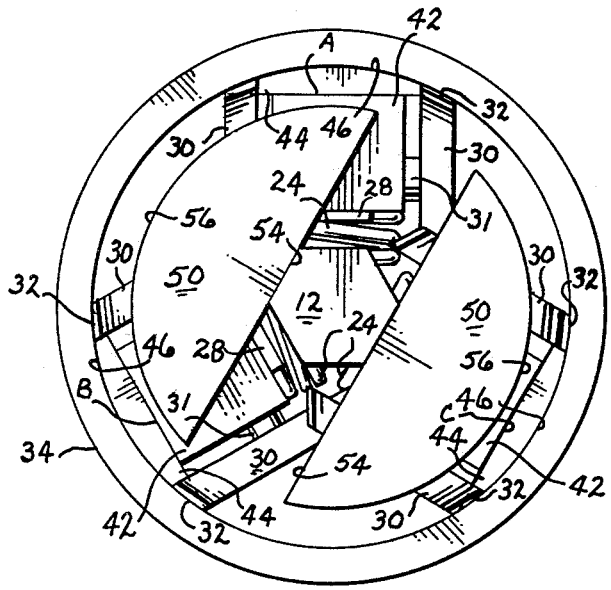
FIGURE 2 is a top plan view of the device in operative position within a drill pipe; and, FIGURE 3 is a horizontal cross-sectional view taken substantially along the line 3—3 of FIG. 1.

The reference numeral 10 indicates the device as a whole, comprising an elongated mandrel 12, preferably hexagonal in cross section, and a plurality of elongated housings or box-like members, indicated by the letters A, B and C, arranged in equally spaced relation around the periphery of the mandrel 12. Each of the box-like members A, B and C, are connected to the mandrel 12 by a pair of stop means 14 comprising a rod portion 16 extended horizontally through a suitable transverse aperture 17 formed in the mandrel 12. One end of each rod 16, projecting through the respective housing, is provided with a flange 18 which is secured to the adjacent wall of the housing by rivets 20. The opposite end of each of the rods 16 is T-shaped, in cross section, as at 22, for contacting the adjacent surface of the mandrel outwardly of the aperture 17 and limiting the movement of the housing away from the mandrel. Thus it may be seen that each housing is free to move toward and away from the mandrel a distance substantially equal to the length of that portion of the rod 16 projecting beyond the mandrel. A plurality of helical springs 24 are interposed between each housing and the adjacent side of the mandrel. Each spring 24 has one end portion received by a recess 26 formed in the adjacent flat surface of the mandrel. Spaced-apart co-operating flanges 28, secured to the adjacent side of the respective housing or box-like member, retains the other end portion of the respective spring 24. The springs normally urge the housings outwardly away from the mandrel 12 and such movement is limited by the contact of the T-shaped end 22 with the mandrel. At least two of the springs associated with the respective housing axially surround respective ones of the rods 16. Each housing A, B and C, is provided with a plurality of pairs of rollers or wheels 30 secured to horizontal axles 31 extending through the respective housing. Each of the wheels are provided with a beveled peripheral edge, as at 32, for co-operative contact with an arc of the inner wall of drill pipe 34.

Figure 3:
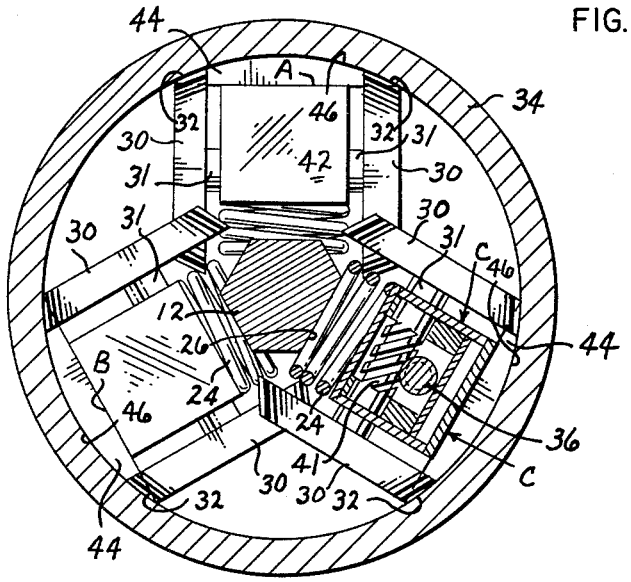

An elongated rod or shaft 36 is extended longitudinally through each housing and is supported adjacent each axle 31 by bearings 38. Worm gears 40, formed on each shaft 36, co-operate with similar gears 41 formed on each respective axle (FIG. 3) whereby rotation of the wheels 30 rotates the respective shaft 36. A conventional registering device 42 is secured to the upper end of each housing A, B and C, and connected with the respective shaft 36. The dials 43 of the registering means 42 are calibrated, in a conventional manner, to indicate one foot of length of the pipe 34 for a selected number of revolutions of the wheels 30, thus registering the total footage traversed by the device. A scraper 44, preferably formed of resilient material and having an arcuate edge 46, is mounted below each pair of wheels 30 in cooperative contact with the inner wall of the drill pipe 34 for removing particles of earth formation which might be clinging to the inner wall of the pipe that might result in separating the respective wheel or wheels from contact with the latter. The depending end portion of the mandrel 12 is provided with a cone-shaped member 48, formed of resilient material, for cushioning the device when it contacts the drill bit.

A pair of semi-circular flaps 50, formed of sheet material, are hingedly connected to opposing sides of the upper portion of the mandrel 12 by spring urged hinges 52. The hinges 52 normally maintain the flaps 50 in an upwardly and outwardly inclined position (FIG. 1) by the contact of the inward edge or chord 54 of the respective flap with the adjacent top end portion of the mandrel. The outer peripheral edge 56 of each flap is arcuately curved on a reduced radius coaxial with the casing 34, as shown in FIG. 2.

*Operation*

In operation the Kelly joint, not shown, is removed from the drill string and the device is inserted into the top end of the drill pipe 34 with the tip end 48 directed downwardly. The registering means 42 is set to zero position. The respective pairs of wheels 30 are maintained in contact with the inner wall of the drill pipe, by the springs 24, as the device is moved, by gravity, toward the drill bit, not shown. If, when using heavy drilling fluids, the progress of the device toward the drill bit is too slow, the Kelly joint may be connected to the top of the drill pipe and the drilling fluid circulated wherein pressure of the fluid is directed against the top of the flange members 50 to move the device downwardly at the same rate of circulation of the drilling fluid. When the tip end 48 contacts the drill bit, drilling fluid pressure against the flange members 50 overcomes the resistance of the spring loaded hinges 52 and fold the flanges downwardly toward the mandrel 12 thus permitting free circulation of drilling fluid. After the drill pipe has been pulled, the drill bit, not shown, is removed and the device is recovered from the bottom portion of the pipe for reading the total length of the drill pipe measured through windows 45 formed in the wall of the registering means 42.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A conduit measuring device adapted to be moved by gravity through a fluid filled upright conduit comprising: an elongated mandrel having spaced-apart transverse apertures intermediate its ends; shock absorbing means connected to the downwardly disposed end of the mandrel; elongated box-like housings arranged in equally spaced parallel relation around said mandrel; support rods connected with each said housing and slidably received by said mandrel through the transverse apertures in the latter, each said rod having a T-shaped end portion, opposite its connection with said housing, projecting beyond the surface of said mandrel opposite the respective said housing for limiting the movement of each said housing away from said mandrel; a plurality of springs interposed between each said housing and said mandrel for normally urging the housings laterally of said mandrel; a plurality of axles journaled in vertically spaced horizontal relation by each said housing; a pair of wheels drivably connected with each said axle; an elongated shaft within each said housing; co-operating gears formed on said shafts and said axles for rotating the shafts in response to rotation of said wheels; and a counter connected to the upper end of each said shaft.

2. A conduit measuring device adapted to be moved by gravity through a fluid filled upright conduit, comprising: an elongated mandrel; shock absorbing means connected to the downwardly disposed end of the mandrel; elongated box-like housings arranged in equally spaced parallel relation around said mandrel; support rods connected with each said housing in vertical spaced relation and slidably connected to said mandrel through transverse apertures in the latter, each said rod having a T-shaped end portion, opposite its connection with said housing, projecting beyond the surface of said mandrel opposite the respective said housing for limiting the movement of each said housing away from said mandrel; a plurality of springs interposed between each said housing and said mandrel for normally urging the housings laterally of said mandrel; pairs of wheels drivably connected to horizontal axles journaled in vertical spaced relation by each said housing, said pairs of wheels each having a peripheral edge formed for cooperative contact with the inner surface of the wall of the upright conduit; an elongated shaft extending vertically through each said housing and drivably connected with each said axle; a counter connected to the upper end of each said shaft; a pair of semicircular flaps; and a pair of spring urged hinges connecting said flaps by their chord edge portions to opposing sides of the upper end portion of said mandrel, said pair of hinges normally maintaining a portion of the chord edge of each said flap in contact with the adjacent surface of said mandrel and positioning said pair of flaps in upwardly diverging relation.

References Cited in the file of this patent

UNITED STATES PATENTS

| | | |
|---|---|---|
| 1,890,607 | Hite | Dec. 13, 1932 |
| 2,245,221 | Nudson et al. | June 10, 1941 |
| 2,834,113 | En Dean et al. | May 13, 1958 |